US007649477B2

(12) United States Patent
Lee et al.

(10) Patent No.: US 7,649,477 B2
(45) Date of Patent: *Jan. 19, 2010

(54) LOCKABLE KEYBOARD FOR A HANDHELD COMMUNICATION DEVICE HAVING A REDUCED ALPHABETIC KEYBOARD

(75) Inventors: Matthew Lee, Belleville (CA); Andrew Bocking, Waterloo (CA); Jason T. Griffin, Kitchener (CA); Steven Fyke, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 222 days.

This patent is subject to a terminal disclaimer.

(21) Appl. No.: 11/423,774

(22) Filed: Jun. 13, 2006

(65) Prior Publication Data

US 2007/0200734 A1  Aug. 30, 2007

Related U.S. Application Data

(60) Provisional application No. 60/773,145, filed on Feb. 13, 2006, provisional application No. 60/773,799, filed on Feb. 14, 2006, provisional application No. 60/773,800, filed on Feb. 14, 2006, provisional application No. 60/773,798, filed on Feb. 14, 2006.

(51) Int. Cl.
*G06F 13/00* (2006.01)
(52) U.S. Cl. .................... 341/22; 345/168; 345/169
(58) Field of Classification Search .............. 341/22, 341/176; 345/168, 169
See application file for complete search history.

(56) References Cited

U.S. PATENT DOCUMENTS 5,825,353 A * 10/1998 Will .......................... 345/184

6,571,086 B1 * 5/2003 Uusimaki ................. 455/90.3
7,083,342 B2 * 8/2006 Griffin ........................ 400/485
2005/0190083 A1  9/2005 Tyneski et al.
2006/0046694 A1 * 3/2006 Yu ............................. 455/411
2007/0182595 A1 * 8/2007 Ghasabian ................... 341/22

FOREIGN PATENT DOCUMENTS

| EP | 0679003 A | 10/1995 |
| EP | 1357510 A | 10/2003 |
| EP | 1523164 A | 4/2005 |
| WO | 02101531 A | 12/2002 |

OTHER PUBLICATIONS

European Search Report for European Patent Application 06253056.3, dated Sep. 5, 2005.
SONY, "Operating Instructions CMD C1 passage," SONY Operating Instructions CCMD-C1, 1998.

(Continued)

*Primary Examiner*—Brian A Zimmerman
*Assistant Examiner*—Hung Q Dang
(74) *Attorney, Agent, or Firm*—Novak Druce + Quigg LLP

(57) ABSTRACT

A handheld electronic device useful for wireless communication has a keyboard including a plurality of externally accessible keys, of which at least a portion have multiple letters associated therewith. The keys can be disabled (i.e. the keyboard can be locked) to prevent accidental actuation thereof by using the navigation tool which has a depressible rolling member. Thus, for example, depression of the rolling member twice in succession or pressing and holding the rolling member down temporarily enables the keyboard lock. The lock can be disabled simply by depressing the rolling member and at least one other key.

45 Claims, 11 Drawing Sheets

OTHER PUBLICATIONS

European Search Report for European Patent Application 06253060.5, dated Sep. 5, 2006.
European Search Report for European Patent Application 06253057.1, dated Oct. 5, 2006.
European Search Report for European Patent Application 06253062.1, dated Oct. 5, 2006.

* cited by examiner

LOCKABLE KEYBOARD FOR A HANDHELD COMMUNICATION DEVICE HAVING A REDUCED ALPHABETIC KEYBOARD

CROSS-REFERENCE TO RELATED APPLICATIONS

The present application claims the benefit of U.S. Provisional Application Nos. 60/773,145, 60/773,798, 60/773,799, and 60/773,800 filed Feb. 13, 2006, Feb. 14, 2006, Feb. 14, 2006, and Feb. 14, 2006, respectively. Said applications are expressly incorporated herein by reference in their entirety.

FIELD

This disclosure relates to a handheld electronic device that includes a keyboard having a plurality of externally accessible and individually actuable keys, and wherein operation of the keyboard can be selectively disabled.

BACKGROUND

Portable handheld communication devices of the types intimated above typically have integrated keyboards that are often exposed on an exterior surface of the device. By the nature of this configuration, the exposed keyboards can be easily unintentionally actuated by "bumps" into the device, and even by lighter brushings up against the device when the keyboard is designed to be especially sensitive.

Today such devices (portable telephones, PDAs and other multi-mode wireless handheld communicators) are being designed smaller and more lightweight so that they can be easily carried along in a pocket, briefcase or handbag. These types of devices typically have the keypad for inputting data into the device, but other types of auxiliary user inputs such as thumb wheels, joysticks and the like are also often included which can also be susceptible to bumps and brushings that cause unintentional actuations. It has been found that such devices and their inputs are particularly vulnerable when carried on a belt or in a pocket of the user. Inadvertent actuations can easily lead to undesired activity such as switching off the device or repeating a last dialed call with an expensive result. It is also possible that the user himself inadvertently presses a key when setting the device to be recharged or when otherwise handling.

Several different arrangements have been suggested in order to eliminate the harmful effects of inadvertent keystrokes in portable handheld communication devices. One example includes a device provided with a pivotally mounted lid, i.e. a 'flip' element, which is meant to cover the keypad when not in use. The flip element hinge also includes a switch that prevents the registration of keystrokes when the lid is closed with an object in between the cover and the keypad which would otherwise potentially actuate the keys. A pivotally mounted flip cover is however a mechanical solution which in the long run deteriorates due to wear and getting dirty.

Therefore, a need exists for a handheld electronic device that is useful for wireless communication and which provides an easy to use "on-the-fly" program-based keyboard lock that avoids inadvertent actuation of keys of the keyboard (or an auxiliary input such as a trackball working in conjunction with the keyboard) which can otherwise enable power consuming features that cause an unnecessary drain on the battery or other detrimental effect.

BRIEF DESCRIPTION OF THE DRAWINGS

Exemplary methods and arrangements conducted and configured according to the advantageous solutions presented herein are depicted in the accompanying drawings where in:

FIG. 8 illustrates an exemplary Dvorak keyboard layout;

FIG. 9 illustrates a QWERTY keyboard layout paired with a traditional ten-key keyboard;

FIG. 10 illustrates ten digits comprising the numerals 0-9 arranged as on a telephone keypad, including the * and # astride the zero;

FIG. 11 illustrates a numeric phone key arrangement according to the ITU Standard E.161 including both numerals and letters;

DETAILED DESCRIPTION

Figure 1:
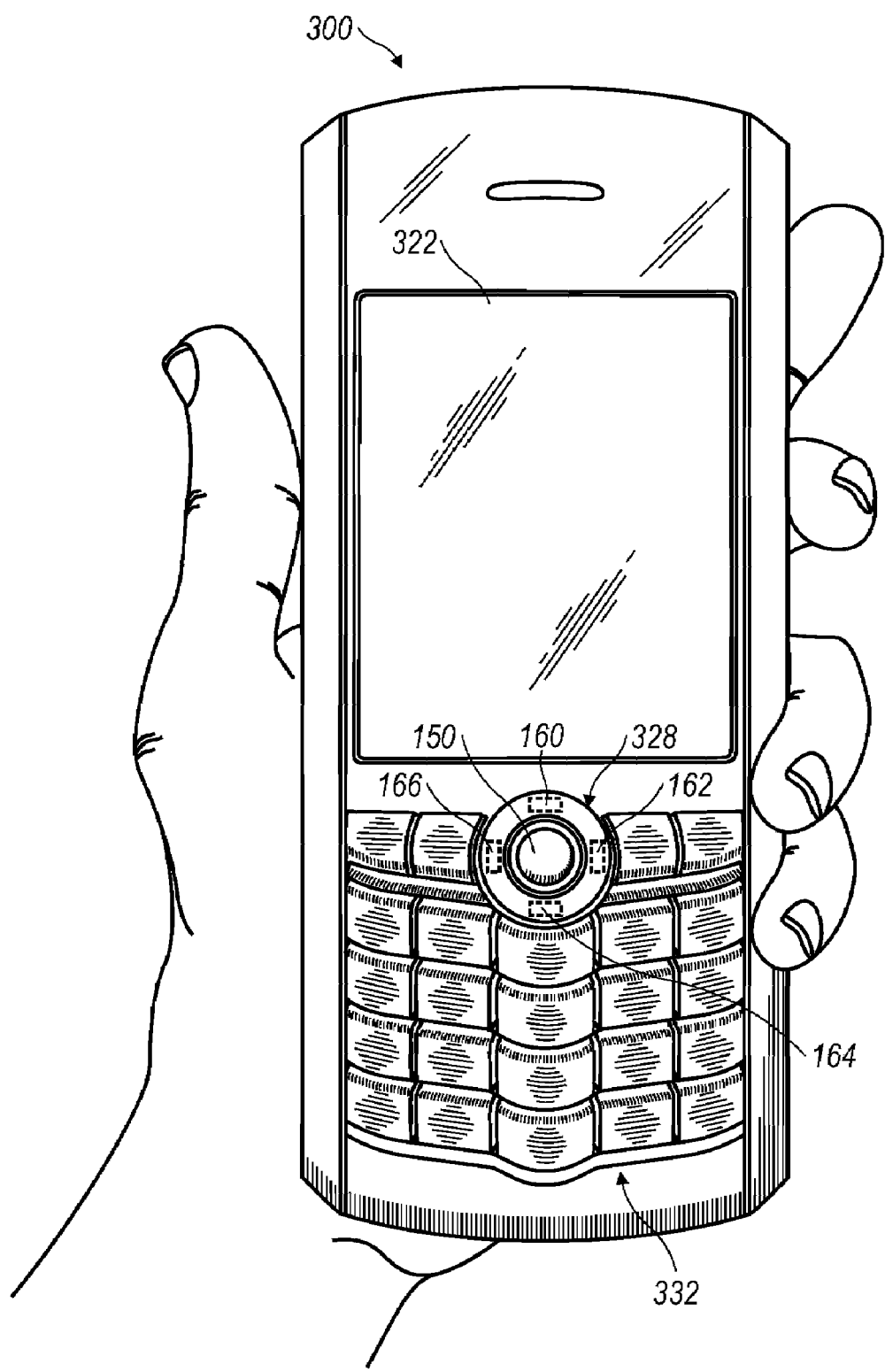
FIG. 1 is a perspective view of a handheld communication device cradled in a user's hand.

As intimated hereinabove, one of the more important aspects of the handheld electronic device to which this disclosure is directed is its size. While some users will grasp the device in both hands, it is intended that a predominance of users will cradle the device in one hand in such a manner that input and control over the device can be affected using the thumb of the same hand in which the device is held. Therefore the size of the device must be kept relatively small; of its dimensions, limiting the width of the device is most important with respect to assuring cradleability in a user's hand. Moreover, it is preferred that the width of the device be maintained at less than ten centimeters (approximately four inches). Keeping the device within these dimensional limits provides a hand cradleable unit that users prefer for its usability and portability. Limitations with respect to the height (length) of the device are less stringent with importance placed on maintaining device hand-cradleability. Therefore, in order to gain greater size, the device can be advantageously configured so that its height is greater than its width, but still remain easily supported and operated in one hand.

A potential problem is presented by the small size of the device in that there is limited exterior surface area for the inclusion of user input and device output features. This is especially true for the "prime real estate" of the front face of the device where it is most advantageous to include a display screen that outputs information to the user and which is preferably above a keyboard utilized for data entry into the device by the user. If the screen is provided below the keyboard, a problem occurs in being able to see the screen while inputting data. Therefore it is preferred that the display screen be above the input area, thereby solving the problem by assuring that the hands and fingers do not block the view of the screen during data entry periods.

To facilitate textual data entry, an alphabetic keyboard is provided. In one version, a full alphabetic keyboard is utilized in which there is one key per letter. This is preferred by some users because it can be arranged to resemble a standard keyboard with which they are most familiar. In this regard, the associated letters can be advantageously organized in QWERTY, QWERTZ or AZERTY layouts, among others, thereby capitalizing on certain users' familiarity with these special letter orders. In order to stay within the bounds of a limited front surface area, however, each of the keys must be commensurately small when, for example, twenty-six keys must be provided in the instance of the English language. An alternative configuration is to provide a reduced keyboard in which at least some of the keys have more than one letter associated therewith. This means that fewer keys can be included which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation; a problem the full keyboard avoids. Preferably, this character discrimination is accomplished utilizing disambiguation software accommodated within the device. As with the other software programs embodied within the device, a memory and microprocessor are provided within the body of the handheld unit for receiving, storing, processing, and outputting data during use. Therefore, the problem of needing a textual data input means is solved by the provision of either a full or reduced alphabetic keyboard on the presently disclosed handheld electronic device.

Keys, typically of a push-button or push-pad nature, perform well as data entry devices but present problems to the user when they must also be used to affect navigational control over a screen-cursor. In order to solve this problem the present handheld electronic device preferably includes an auxiliary input that acts as a cursor navigational tool and which is also exteriorly located upon the front face of the device. Its front face location is particularly advantageous because it makes the tool easily thumb-actuable like the keys of the keyboard. A particularly usable embodiment provides the navigational tool in the form of a trackball which is easily utilized to instruct two-dimensional screen cursor movement in substantially any direction, as well as act as an actuator when the ball of the trackball is depressible like a button. The placement of the trackball is preferably above the keyboard and below the display screen; here, it avoids interference during keyboarding and does not block the user's view of the display screen during use.

In some configurations, the handheld electronic device may be standalone in that it is not connectable to the "outside world." One example would be a PDA that stores such things as calendars and contact information, but is not capable of synchronizing or communicating with other devices. In most situations such isolation will be detrimentally viewed in that at least synchronization is a highly desired characteristic of handheld devices today. Moreover, the utility of the device is significantly enhanced when connectable within a system, and particularly when connectable on a wireless basis in a system in which both voice and text messaging are accommodated This disclosure describes methods and arrangements for affecting a lockable keyboard on a handheld electronic device 300, variously configured as described above. More specifically, the handheld electronic device 300 is enabled to selectively disable the keyboard from operating upon actuation of individual keys.

As used herein, the term handheld electronic device 300 describes a relatively small device that is capable of being held in a user's hand. It is a broader term that includes devices that are further classified as handheld communication devices 300, which interact with a communications network 319.

Figure 18:
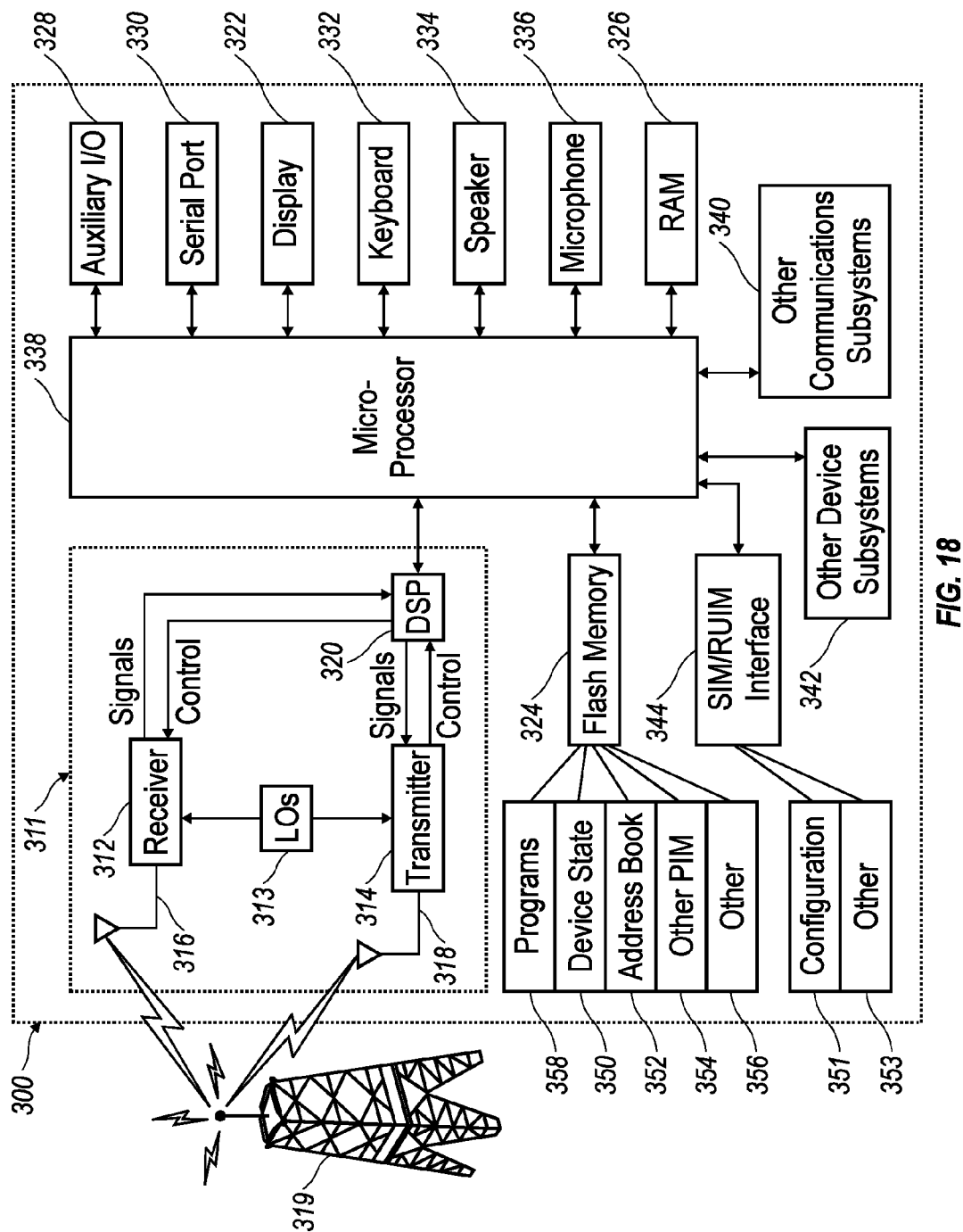
FIG. 18 is a block diagram representing a wireless handheld communication device interacting in a communication network.

As depicted in FIG. 18, the handheld communication device 300 transmits data to, and receives data from a communication network 319 utilizing radio frequency signals, the details of which are discussed more fully hereinbelow. Preferably, the data transmitted between the handheld communication device 300 and the communication network 319 supports voice and textual messaging, though it is contemplated that the method for producing audible sound is equally applicable to single mode devices; i.e. voice-only devices and text-only devices.

As may be appreciated from FIG. 1, the handheld electronic device 300 comprises a lighted display 322 located above a keyboard 332 suitable for accommodating textual input to the handheld electronic device 300 when in an operable configuration. Preferably, the screen 322 and keyboard 332 are located at the front face of the handheld electronic device 300. As shown, the device 300 is of unibody construction, but it is also contemplated that the device may be of an alternative construction such as that commonly known as "clamshell" or "flip-phone" style. Regardless, in operable configuration for the device 300, the navigation tool (auxiliary input) 328 is located essentially between the display 322 and the keyboard 332.

Figure 12:
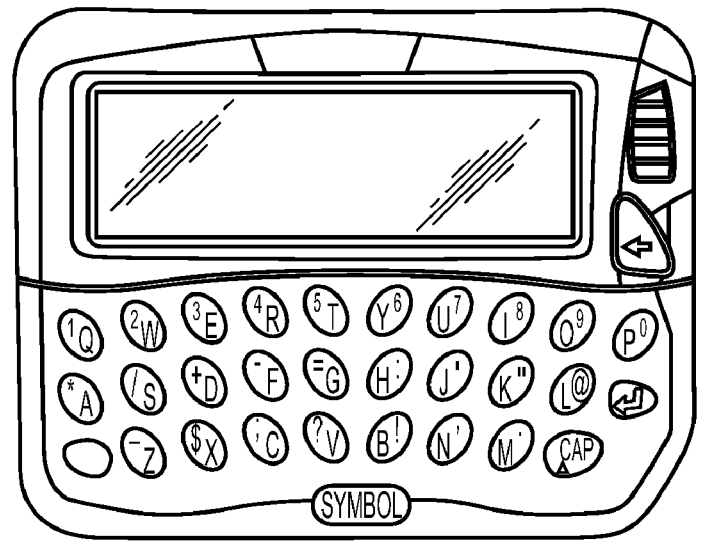
FIG. 12 is a front view of an exemplary handheld electronic device including a full QWERTY keyboard.
Figure 13:
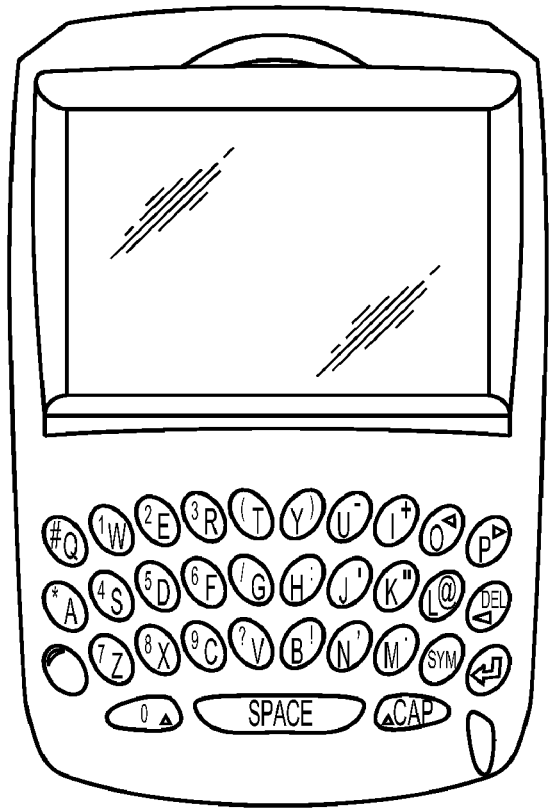
FIG. 13 is a front view of another exemplary handheld electronic device including a full QWERTY keyboard.

In one embodiment, the keyboard 332 comprises a plurality of keys with which alphabetic letters are associated on one letter per key basis. It is contemplated that the keys may be directly marked with letters, or the letters may be presented adjacent, but clearly in association with a particular key. This one-to-one pairing between the letters and keys is depicted in FIGS. 12 and 13 and is described in greater detail below in association therewith. In order to facilitate user input, the alphabetic letters are preferably configured in a familiar QWERTY, QWERTZ, AZERTY, or Dvorak layout, each of which is also discussed in greater detail hereinbelow.

In the alternative embodiment of FIG. 1, the keyboard 332 comprises a plurality of keys with which alphabetic letters are also associated, but at least a portion of the individual keys have multiple letters associated therewith. This type of configuration is referred to as a reduced keyboard (in comparison to the full keyboard described immediately above) and can, among others come in QWERTY, QWERTZ, AZERTY, and Dvorak layouts.

As depicted in FIG. 1, the auxiliary input 328 is a trackball 150. The trackball 150 is exposed for user manipulation at an exterior face of the device 300. The ball 150 of the trackball navigation tool is freely rotatable. Motion of the trackball 150 is assessed using a plurality of power-consuming sensors 160, 162, 164, 166 that are positioned adjacent the trackball navigation tool 328 and determine increments of rotation of the ball 150 about a particular axis of rotation. In a preferred embodiment, the power-consuming sensors 160, 162, 164, 166 that quantify rotational motion of the trackball 150 about an intersecting x-axis 152 and an intersecting y-axis 154 of the trackball (see FIG. 2). The power-consuming sensors 160, 162, 164, 166 require power to be supplied to detect motion of the ball 150. If there is no power supplied to the power-consuming sensor 160, 162, 164, 166, movement of the ball 150 is not registered by the sensors 160, 162, 164, 166. These power-consuming sensors 160, 162, 164, 166 further output a cursor control signal based upon the sensed motion of the ball 150. In one embodiment, these power-consuming sensors are located proximate to the trackball 150. Furthermore, the trackball 150 utilizes a sensor (not shown) to detect depression of the ball 150.

In one embodiment, the plurality of power-consuming sensors 160, 162 number two. One of the two sensors 162 outputs signals indicative of x-component rolling motion of the trackball 150 relative to the handheld electronic device 300 and about the intersecting y-axis 154 of the trackball (see the rotational arrows about the y-axis in FIG. 2). The other of the two sensors 160 outputs signals indicative of y-component rolling motion of the trackball 150 relative to the handheld electronic device 300 and about the intersecting x-axis 152 of the trackball (see the rotational arrows about the x-axis in FIG. 2). In this configuration, the two sensors 160, 162 are oriented radially about the trackball 150 with approximately ninety degree spacing therebetween. In one embodiment, each of the sensors is a hall effect sensor located proximate the trackball 150.

Figure 2:
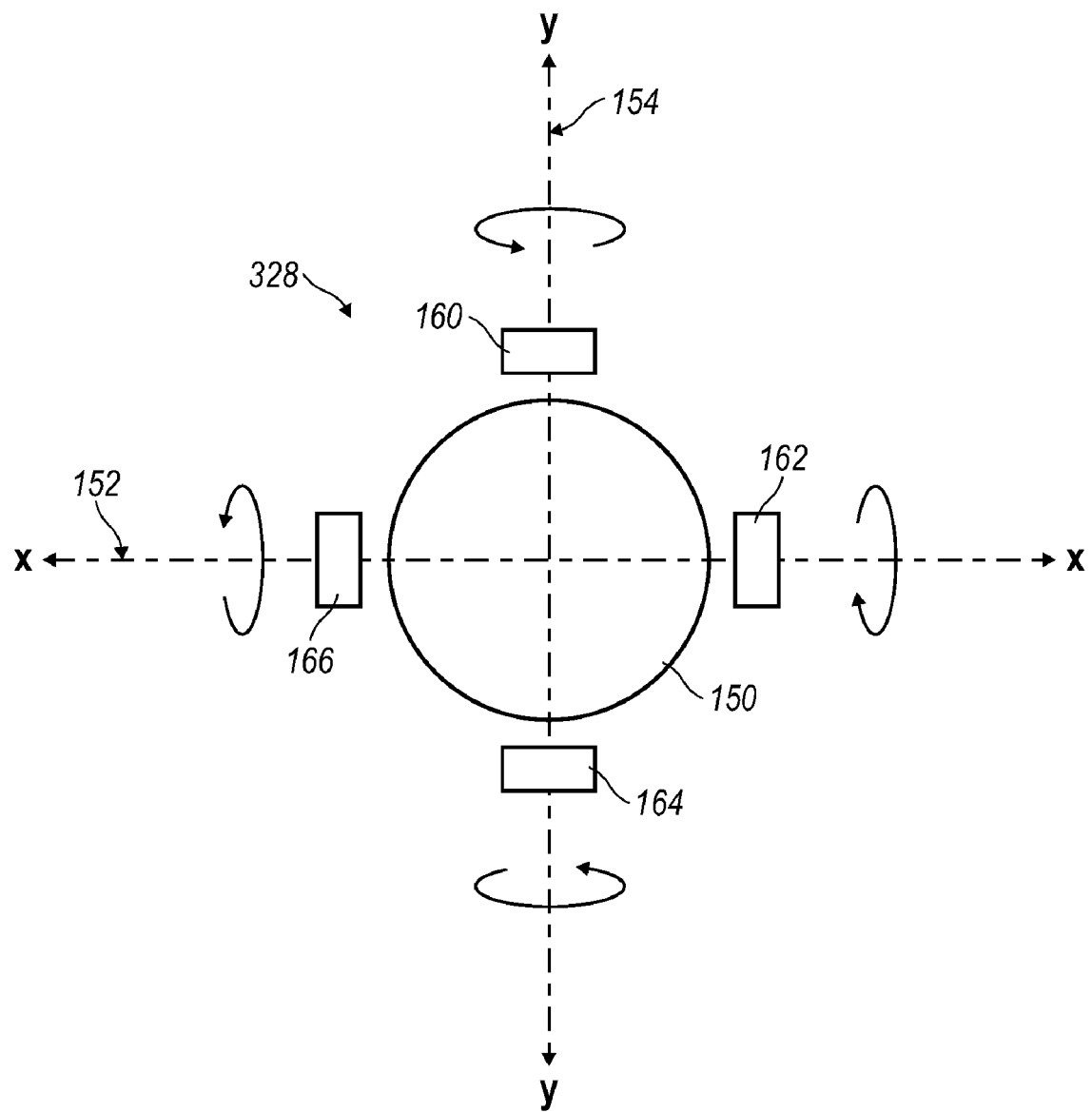
FIG. 2 is a schematic representation of an auxiliary input in the form of a trackball.

In another embodiment, the plurality of power-consuming sensors 160, 162, 164, 166 number four. A first pair of opposed sensors 162, 166 outputs signals indicative of x-component rolling motion of the trackball 150 relative to the handheld electronic device 300 and about the intersecting y-axis 154. A second pair of opposed sensors 160, 164 outputs signals indicative of a y-component rolling motion of the trackball 150 relative to the handheld electronic device 300 and about the intersecting x-axis 152. The four power-consuming sensors 160, 162, 164, 166 are oriented radially about the trackball 150 with approximately ninety degree spacing between consecutive sensors as depicted in FIGS. 1 and 2. In one embodiment, the power-consuming sensors 160, 162, 164, 166 are hall effect sensors.

The above has been described in relation to power-consuming sensors for a trackball navigation tool 328. While the sensors are preferably power-consuming, other sensors which do not require power to detect motion of the trackball are considered within the scope of this disclosure. Additionally, the navigation tool 328 may take the form of non-trackball based devices. As described below, these other devices feature a rolling member. Some examples of navigation tools that feature a rolling member include but are not limited to a wheel and roller barrel.

As with many small objects, users are inclined or desire to carry handheld communication devices in their pockets. However, when a handheld communication device is placed in a user's pocket it is susceptible to inadvertent actuation. This is especially true for those devices 300 that enable navigation through use of a rolling tool 328 because often the rolling tool 328 supersedes the plane, as defined by the upper surface of the keys on the keyboard 332, and thus is the most susceptible to inadvertent rolling. Furthermore, the rolling tool is susceptible to rotation because of the very small resistance to motion of the device. The present solutions are directed towards methods for controlling key operability on handheld communication devices 300 through use of the navigation tool's rolling member 150 exemplified in FIG. 1.

Figure 4:
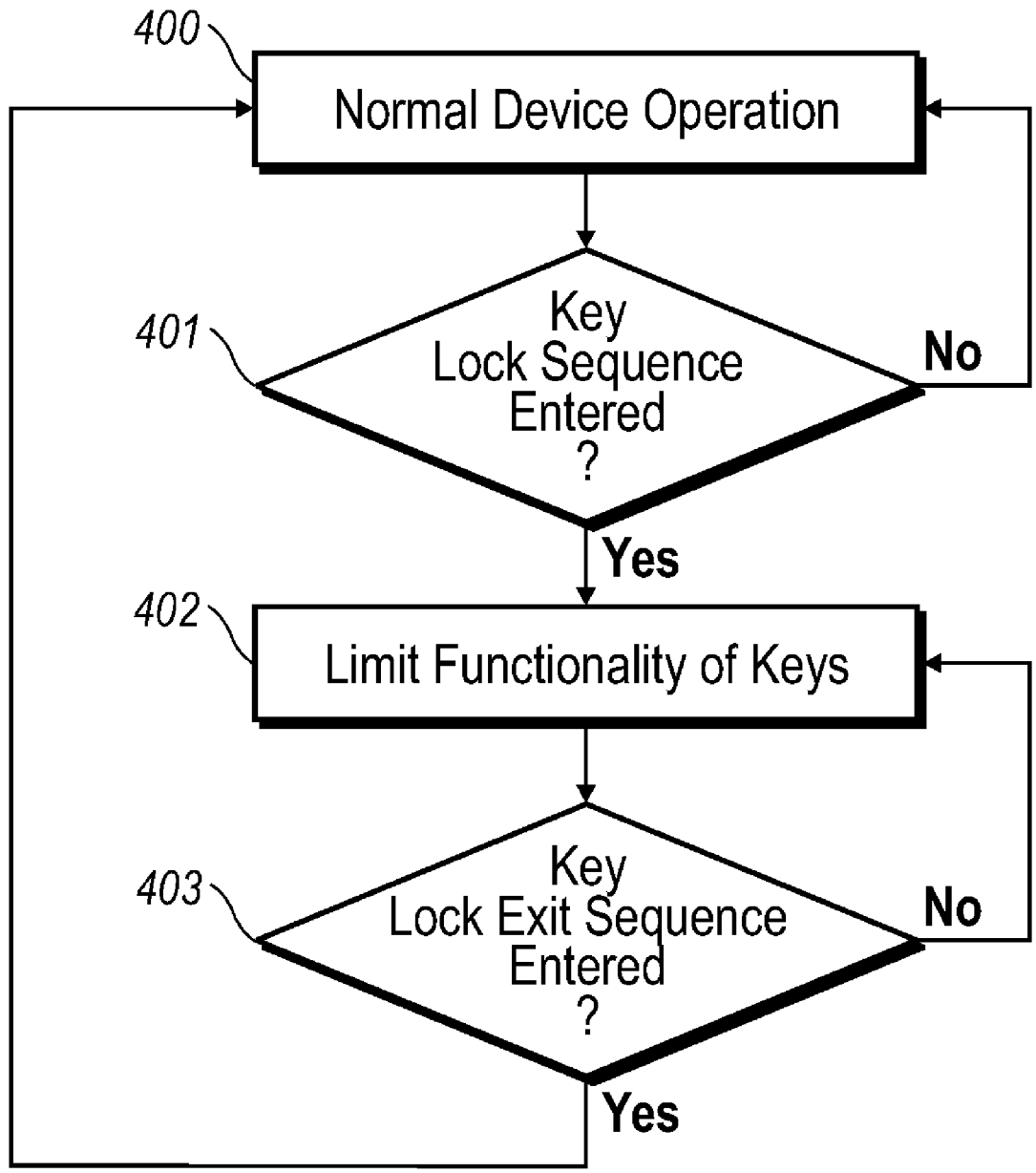
FIG. 4 is a flow chart illustrating an exemplary method for locking keyboard operation on a handheld electronic device.

One exemplary embodiment, as shown in FIG. 4, employs a method for protecting a handheld electronic device 300—one that is provided with a keypad having a multiplicity of depressible keys—from inadvertent depressions of the keys. The method includes providing a navigation tool 328 having a rolling member 150 that rolls about at least one axis (152, 154) such that the navigation tool 328 is actuable by rolling and by depressing the rolling member 150. The handheld electronic device 300 may change its mode from normal device operation 400 to an established keyboard lock mode—a mode that prevents or limits key functionality 402 for at least part of the keyboard 332. The keyboard lock mode is activated when a keyboard command or key lock sequence is first entered 401 by the navigation tool 328. While the functionality of the keys can be described as limited or disabled, the keys continue to function but not cause the device to function normally. Thus, there is limited device features available when in the keyboard lock mode such as answering telephone calls with designated keys. In one embodiment, if a key is depressed while in keyboard lock mode the display screen presents a message indicated that a lock mode is currently engaged and preferably indicating how to disable the lock mode.

In another embodiment, the keyboard lock mode is actuated if the first keyboard command is a maintained depression of the rolling member 150 for a predetermined period of time.

The handheld electronic device 300 may also be set to disengage the keyboard lock mode. Disengagement would occur in response to a second given keyboard command that differs from the first keyboard command. During the keyboard lock mode, only the keys capable of giving the second command are functional. Once the key lock exit sequence is entered 403, the device 300 resumes normal operation 400.

In yet another embodiment, a handheld electronic device 300 useful for wireless communication is disclosed. Within this device are a display 322 and a keyboard 332 for producing commands indicative of functions to be performed. Additionally, there exists a navigation tool 328 for producing navigation tool commands indicative of functions to be performed. The navigation tool 328 has a rolling member 150 that rolls about at least one axis (152, 154); the navigation tool 328 is actuable by rolling and by depressing the rolling member 150. The navigation tool 328 is located below the display 322 and above the keyboard 332. The handheld electronic device is equipped to interpret the navigation tool and keyboard commands given by the navigation tool 328 and keyboard 332 and subsequently perform the functions associated with the commands. The handheld electronic device 300 is also equipped with a keyboard lock mode. Within this mode, the device 300 temporarily renders at least part of the keys on the keyboard 332 inoperable.

Further, the device 300 is capable of both detecting when the navigation tool 328 gives a keyboard lock command and transmitting the command to the keyboard 332 so as to ensure its completion. Specifically, the device 300 detects the maintained depression of the rolling member 150 for a predetermined period of time and consequently produces the indicative signal activating the keyboard lock mode. It should also be noted that the device 300 is capable of detecting a keyboard unlock command given by the keyboard 332. Though this command may differ from the keyboard lock command of the rolling member 150, the indicative signal to deactivate the keyboard lock mode will be produced. However, while the keyboard lock mode is activated, only those keys needed for deactivating the keyboard lock mode remain functional. All other keys on the keyboard 332 will be rendered inoperable until the keyboard lock mode is deactivated.

In another embodiment, a handheld electronic device 300 useful for wireless communication is disclosed. Within this device is a navigation tool 328 for producing navigation tool commands indicative of functions to be performed. The navigation tool 328 possesses a rolling member 150 that rolls about at least one axis (152, 154) and the navigation tool 328 is actuale by rolling and depressing the rolling member. Additionally, there exists a keyboard 332 having a multiplicity of depressible keys for producing keyboard commands indicative of functions to be performed. Further, the device 300 is capable of interpreting the navigation tool and keyboard commands give by the depressible keys of the keyboard 332 and subsequently producing the appropriate functions. Among these functions is a keyboard lock mode. Within this mode, the device 300 renders at least part of the keys of the keyboard 332 inoperable.

The handheld electronic device 300 may detect the manner in which the rolling member 150 is depressed and produce an indicative signal for the keyboard lock mode. This signal would then be transmitted to and received by the keyboard 332 so as to ensure its completion. Specifically, the device 300 may detect the maintained depression of the rolling member 150 for a predetermined period of time and produce the indicative signal that activates the keyboard lock mode. It should also be noted that the device 300 is capable of detecting a keyboard unlock command given by the keyboard 332. Though this command may differ from the keyboard lock command of the rolling member 150, the indicative signal to deactivate the keyboard lock mode will be produced. However, while the keyboard lock mode is activated, only those keys needed for deactivating the keyboard lock mode remain functional. All other keys on the keyboard 332 will be rendered inoperable until the keyboard lock mode is deactivated.

In yet another embodiment, a handheld communication device 300 useful for wireless communication is disclosed. Within the device 300 is a navigation tool 328 having a rolling member 150 that rolls about at least one axis (152, 154); the navigation tool 328 is actuable by rolling and by depressing the rolling member 150. There also exists a keypad having a plurality of externally accessible and individually actuable keys. When the navigation tool 328 has been depressed for a predetermined number of times, the device 300 is both capable of recognizing the actuation of the navigation tool 328 and responding appropriately by disabling at least some of the keys on the keypad.

As described in the embodiment above, the device's navigation tool 328 may be selected from the group consisting of a trackball 150, a wheel, and a roller barrel. The trackball 150 has a ball in housing 328 and is capable of rolling about a plurality of axes (152, 154). The trackball 150 is actuable by rolling and by depressing the ball. As such, the device can detect accidental rolling and depressing of the trackball 150 and consequently disables a portion of the plurality of keys. This allows the device to enable a feature automatically that limits the functionality of the keys. The portion of the plurality of keys refers to all the keys other than a first key. With subsequent actuations of the navigation tool 328 and at least one of the plurality of keys in the predetermined order, the other keys will become functional again. At least one of the plurality of keys is a first key and the first key is associated with at least one alternative function. However, when a portion of the plurality of keys is disabled, the alternative function of the first key is disabled too. In addition, the predetermined order of the navigation tool 328 and key actuation may involve depressing the navigation tool 328 and the first key simultaneously. Alternatively, the predetermined order of key actuation involves depressing the navigation tool 328 and the first key successively. Regardless of key operability, if the device 300 senses an incoming call, it will respond by automatically interrupting any existing key disablement mode and terminating it.

In an embodiment, the keyboard lock mode allows for locking the keyboard of the device such that the keys have limited functionality. This mode is enabled through clicking and holding the trackball 150 for approximately two seconds. This time preferably is between one and four seconds. The device will then be in a keyboard lock mode. In order to unlock or regain full functionality of the keys, the trackball is clicked and the "*" key or some other key is selected simultaneously or in quick succession. If the trackball 150 is depressed or a key is actuated then the display screen of the device is activated and a message informing the user of the method of leaving key lock is displayed. Preferably, the screen will only stay on for a short amount of time such as less than ten seconds and preferably less than 5 seconds. If the screen is on while in keyboard lock mode, the trackball if rolled during this period of time does not continue to provide illumination of the screen.

When a device includes a security feature that prevents access to the device without a password and is set to timeout after a particular amount of time, the keyboard lock feature will operate in cooperation with the security time out feature. The security timeout feature will prevent access to the device if a specified period of time has been exceeded. Once the keyboard lock feature has been enable, subsequent detections of trackball 150 depressions and key actuation will not interrupt the timeout feature. When the timeout has been set at two minutes for example, a subsequent depression of the trackball after the elapse of one minute from activation of the keyboard lock feature will not prevent the device from entering into the security lock feature after two minutes from the time of the initial keyboard lock feature activation.

Further aspects of the environments, devices and methods of employment described hereinabove are expanded upon in the following details. An exemplary embodiment of the handheld electronic device 300 as shown in FIG. 1 is cradleable in the palm of a user's hand. The size of the device 300 is such that a user is capable of operating the device using the same hand that is holding the device. In a preferred embodiment, the user is capable of actuating all features of the device 300 using the thumb of the cradling hand. While in other embodiments, features may require the use of more than just the thumb of the cradling hand. The preferred embodiment of the handheld device 300 features a keyboard 332 on the face of the device 300, which is actuable by the thumb of the hand cradling the device 300. The user may also hold the device 300 in such a manner to enable two-thumb typing on the device 300. Furthermore, the user may use fingers rather than thumbs to actuate the keys on the device 300. In order to accommodate palm-cradling of the device 300 by the average person, it is longer (height as shown in FIG. 1) than it is wide, and the width is preferably between approximately two and three inches, but by no means limited to such dimensions.

The handheld electronic device 300 includes an input portion and an output display portion. The output display portion can be a display screen 322, such as an LCD or other similar display device.

The input portion includes a plurality of keys that can be of a physical nature such as actuable buttons or they can be of a software nature, typically constituted by virtual representations of physical keys on a display screen (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application or feature in use, specific keys can be enabled or disabled.

In the case of physical keys, all or a portion of the plurality of keys have one or more indicia displayed at their top surface and/or on the surface of the area adjacent the respective key, the particular indicia representing the character(s), command(s) and/or function(s) typically associated with that key. In the instance where the indicia of a key's function is provided adjacent the key, it is understood that this may be a permanent insignia that is, for instance, printed on the device cover beside the key, or in the instance of keys located adjacent the display screen, a current indicia for the key may be temporarily shown nearby the key on the screen.

In the case of software keys, the indicia for the respective keys are shown on the display screen, which in one embodiment is enabled by touching the display screen, for example, with a stylus to generate the character or activate the indicated command or function. Such display screens may include one or more touch interfaces, including a touchscreen. A non-exhaustive list of touchscreens includes, for example, resistive touchscreens, capacitive touchscreens, projected capacitive touchscreens, infrared touchscreens and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device 300 is shown on the display screen 322 in the same configuration as the physical keys. Thus, the desired character, command or function is obtained by depressing the physical key corresponding to the character, command or function displayed at a corresponding position on the display screen, rather than touching the display screen 322. To aid the user, indicia for the characters, commands and/or functions most frequently used are preferably positioned on the physical keys and/or on the area around or between the physical keys. In this manner, the user can more readily associate the correct physical key with the character, command or function displayed on the display screen 322.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations of the English-language alphabet.

Figure 5:
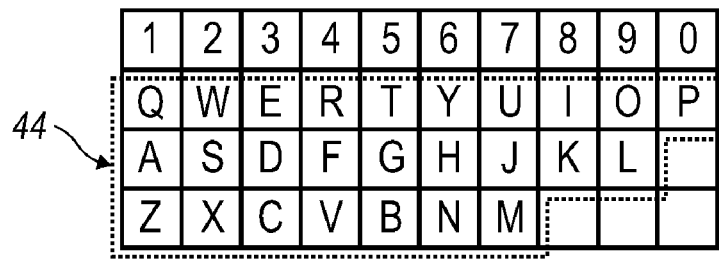
FIG. 5 illustrates an exemplary QWERTY keyboard layout.

The QWERTY keyboard layout is the standard English-language alphabetic key arrangement 44 (see FIG. 5). In this configuration, Q, W, E, R, T and Y are the letters on the top left, alphabetic row. It was designed by Christopher Sholes, who invented the typewriter. The keyboard layout was organized by him to prevent people from typing too fast and jamming the keys. The QWERTY layout was included in the drawing for Sholes' patent application in 1878, U.S. Pat. No. 207,559.

Figure 6:
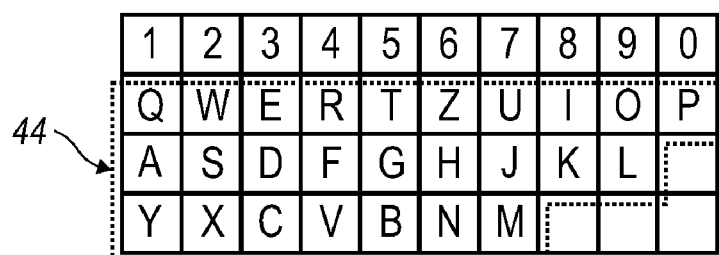
FIG. 6 illustrates an exemplary QWERTZ keyboard layout.

The QWERTZ keyboard layout is normally used in German-speaking regions. This alphabetic key arrangement 44 is shown in FIG. 6. In this configuration, Q, W, E, R, T and Z are the letters on the top left, alphabetic row. It differs from the QWERTY keyboard layout by exchanging the "Y" with a "Z". This is because "Z" is a much more common letter than "Y" in German and the letters "T" and "Z" often appear next to each other in the German language.

Figure 7:
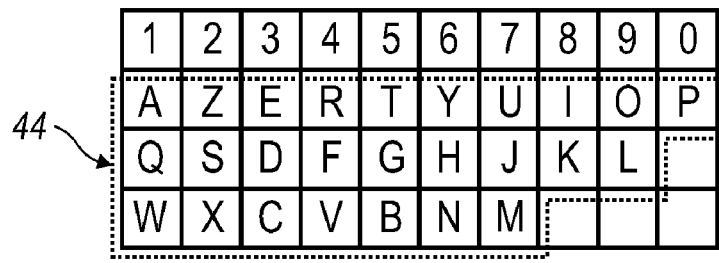
FIG. 7 illustrates an exemplary AZERTY keyboard layout.

The AZERTY keyboard layout is normally used in French-speaking regions. This alphabetic key arrangement 44 is shown in FIG. 7. In this configuration, A, Z, E, R, T and Y are the letters on the top left, alphabetic row. It is similar to the QWERTY layout, except that the letters Q and A are swapped, the letters Z and W are swapped, and the letter M is in the middle row instead of the bottom one.

Figures 8, 9, 10, 11:
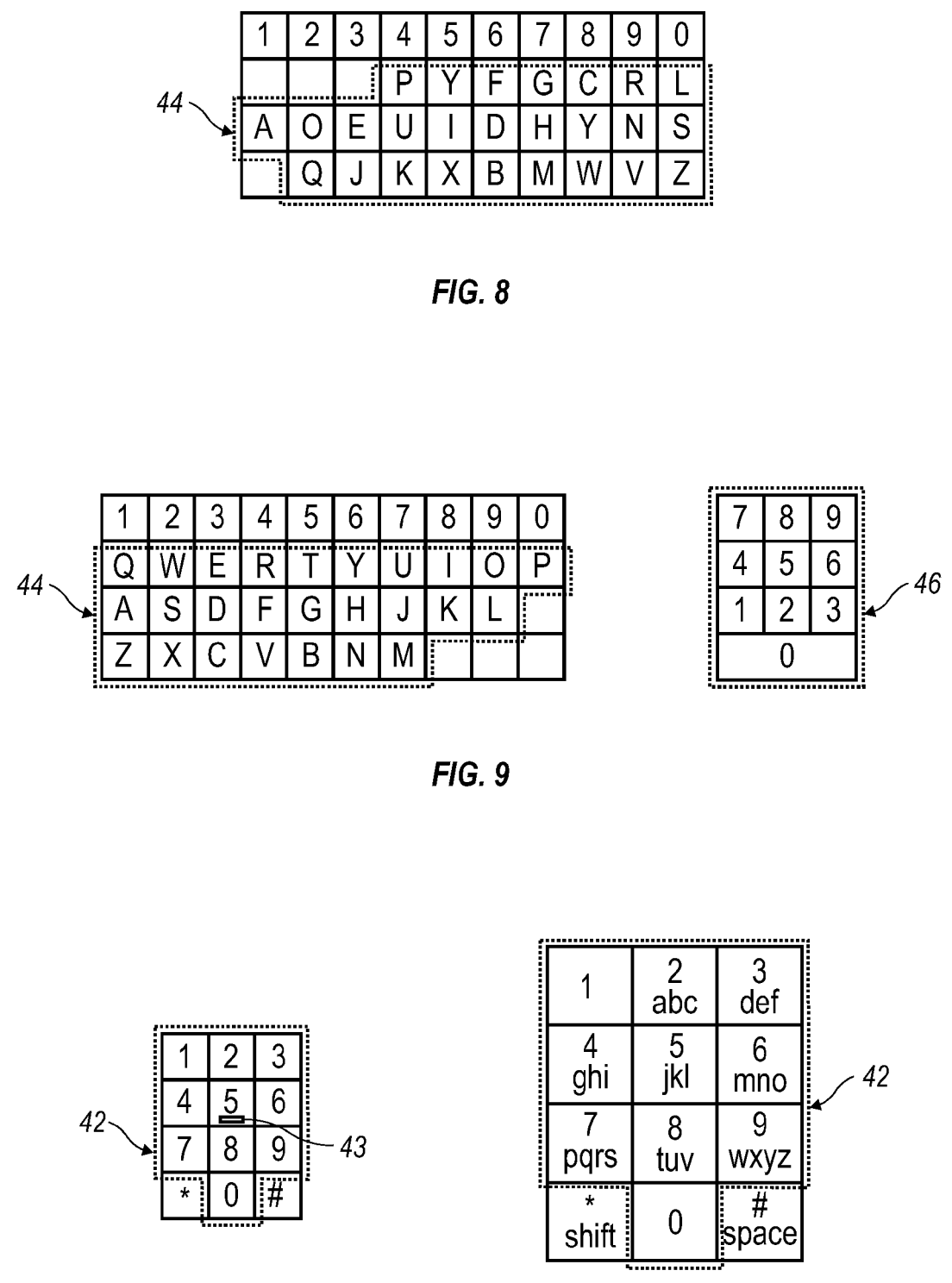

The Dvorak keyboard layout was designed in the 1930s by August Dvorak and William Dealey. This alphabetic key arrangement 44 is shown in FIG. 8. It was developed to allow a typist to type faster. About 70% of words are typed on the home row compared to about 32% with a QWERTY keyboard layout, and more words are typed using both hands. It is said that in eight hours, fingers of a QWERTY typist travel about 16 miles, but only about 1 mile for the Dvorak typist.

Alphabetic key arrangements in full keyboards and typewriters are often presented along with numeric key arrangements. An exemplary numeric key arrangement is shown in FIGS. 5-8 where the numbers 1-9 and 0 are positioned above the alphabetic keys. In another known numeric key arrangement, numbers share keys with the alphabetic characters, such as the top row of the QWERTY keyboard. Yet another exemplary numeric key arrangement is shown in FIG. 9, where a numeric keypad 46 is spaced from the alphabetic/numeric key arrangement. The numeric keypad 46 includes the numbers "7", "8", "9" arranged in a top row, "4", "5", "6" arranged in a second row, "1", "2", "3" arranged in a third row, and "0" in a bottom row, consistent with what may be found on a known "ten-key" computer keyboard keypad. Additionally, a numeric phone key arrangement 42 is also known, as shown in FIG. 10.

As shown in FIG. 10, the numeric phone key arrangement 42 may also utilize a surface treatment on the surface of the center "5" key. This surface treatment is such that the surface of the key is distinctive from the surface of other keys. Preferably the surface treatment is in the form of a raised bump or recessed dimple 43. This bump or dimple 43 is typically standard on telephones and is used to identify the "5" key through touch alone. Once the user has identified the "5" key, it is possible to identify the remainder of the phone keys through touch alone because of their standard placement. The bump or dimple 43 preferably has a shape and size that is readily evident to a user through touch. An example bump or dimple 43 may be round, rectangular, or have another shape if desired. Alternatively, raised bumps may be positioned on the housing around the "5" key and do not necessarily have to be positioned directly on the key, as known by those of skill in the art.

Handheld electronic devices 300 that include a combined text-entry keyboard and a telephony keyboard are also known. Examples of such mobile communication devices include mobile stations, cellular telephones, wireless personal digital assistants (PDAs), two-way paging devices, and others. Various keyboards are used with such devices depending in part on the physical size of the handheld electronic device 300. Some of these are termed full keyboard, reduced keyboard, and phone key pads.

In embodiments of a handheld electronic device 300 having a full keyboard, only one alphabetic character is associated with each one of a plurality of physical keys. Thus, with an English-language keyboard, there are at least 26 keys in the plurality, one for each letter of the English alphabet. In such embodiments using the English-language alphabet, one of the keyboard layouts described above is usually employed, and with the QWERTY keyboard layout being the most common.

One known device that uses a full keyboard for alphabetic characters and incorporates a combined numeric keyboard is shown in FIG. 12. In this device, numeric characters share keys with alphabetic characters on the top row of the QWERTY keyboard. Another device that incorporates a combined alphabetic/numeric keyboard is shown in FIG. 13. This device utilizes numeric characters in a numeric phone key arrangement consistent with the ITU Standard E.161, as shown in FIG. 10. The numeric characters share keys with alphabetic characters on the left side of the keyboard.

In order to further reduce the size of a handheld electronic device 300 without making the physical keys or software keys too small, some handheld electronic devices 300 use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor of these types of handheld electronic device 300 to determine or predict what letter or word has been intended by the user. Predictive text technologies can also automatically correct common spelling errors. Predictive text methodologies often include a disambiguation engine and/or a predictive editor application. This helps facilitate easy spelling and composition, since the software is preferably intuitive software with a large word list and the ability to increase that list based on the frequency of word usage. The software preferably also has the ability to recognize character letter sequences that are common to the particular language, such as, in the case of English, words ending in "ing." Such systems can also "learn" the typing style of the user making note of frequently used words to increase the predictive aspect of the software. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard arrangement and keyboard described herein, without limitation.

The multi-tap method of character selection has been in use a number of years for permitting users to enter text using a touch screen device or a conventional telephone key pad such as specified under ITU E 1.161, among other devices. Multi-tap requires a user to press a key a varying number of times, generally within a limited period of time, to input a specific letter, thereby spelling the desired words of the message. A related method is the long tap method, where a user depresses the key until the desired character appears on the display out of a rotating series of letters.

A "text on nine keys" type system uses predictive letter patterns to allow a user to ideally press each key representing a letter only once to enter text. Unlike multi-tap which requires a user to indicate a desired character by a precise number of presses of a key, or keystrokes, the "text-on-nine-keys" system uses a predictive text dictionary and established letter patterns for a language to intelligently guess which one of many characters represented by a key that the user intended to enter. The predictive text dictionary is primarily a list of words, acronyms, abbreviations and the like that can be used in the composition of text.

Generally, all possible character string permutations represented by a number of keystrokes entered by a user are compared to the words in the predictive text dictionary and a subset of the permutations is shown to the user to allow selection of the intended character string. The permutations are generally sorted by likelihood of occurrence which is determined from the number of words matched in the predictive text dictionary and various metrics maintained for these words. Where the possible character string permutations do not match any words in the predictive text dictionary, the set of established letter patterns for a selected language can be applied to suggest the most likely character string permutations, and then require the user to input a number of additional keystrokes in order to enter the desired word.

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

Figure 14:
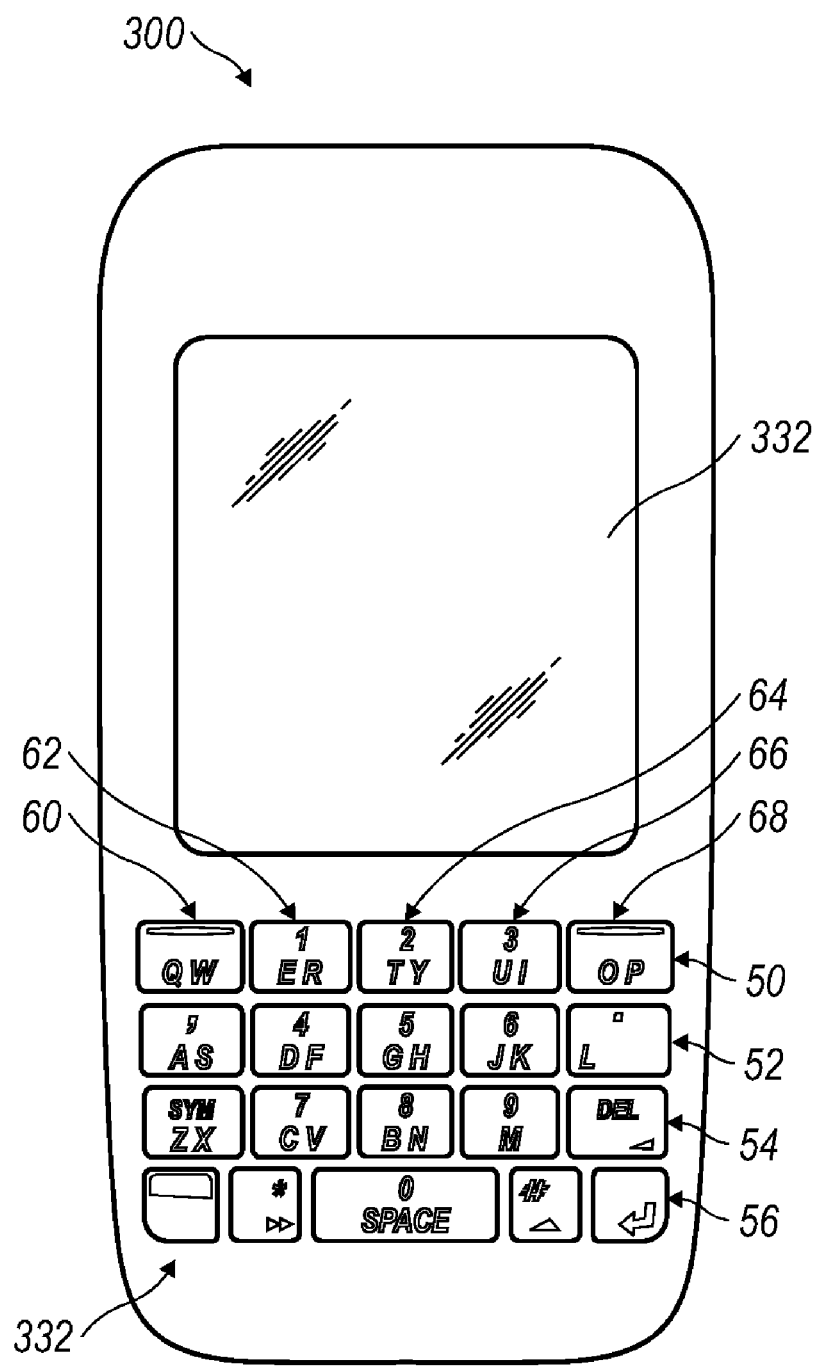
FIG. 14 is a front view of an exemplary handheld electronic device including a reduced QWERTY keyboard.

FIG. 14 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 332. The four rows include a first row 50, a second row 52, a third row 54, and a fourth row 56. The five columns include a first column 60, a second column 62, a third column 64, a fourth column 66, and a fifth column 68. Each of the keys in the first row 50, second row 52, and third row 54 is uniformly sized while the keys in the fourth, bottom row 56 have different sizes relative to one another and to the keys in the first three rows 50, 52, 54. The rows and columns are straight, although the keys in the fourth row 56 do not align completely with the columns because of their differing sizes. The columns substantially align with the longitudinal axis x-x of the device 300.

Figure 15:
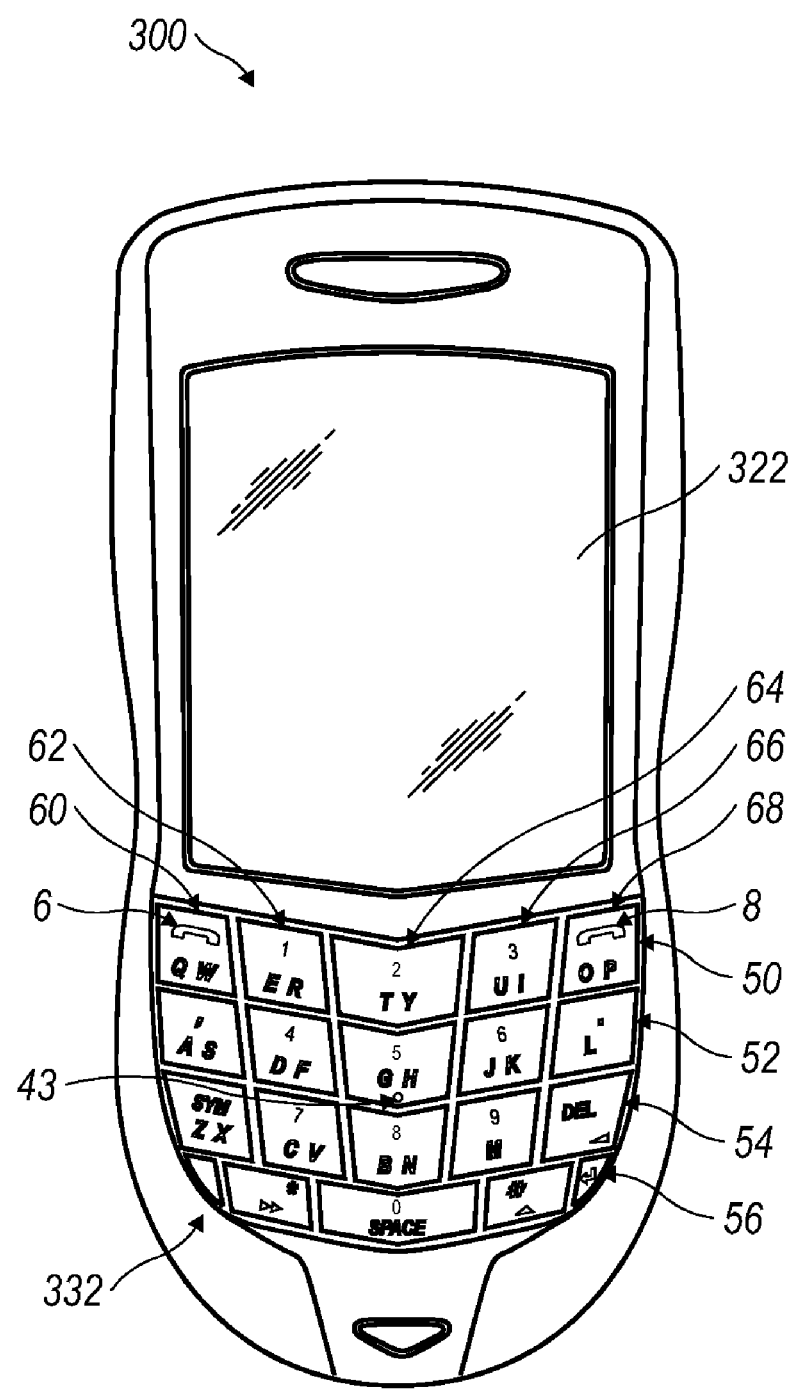
FIG. 15 is an elevational view of the front face of another exemplary handheld electronic device including a reduced QWERTY keyboard.
Figure 16:
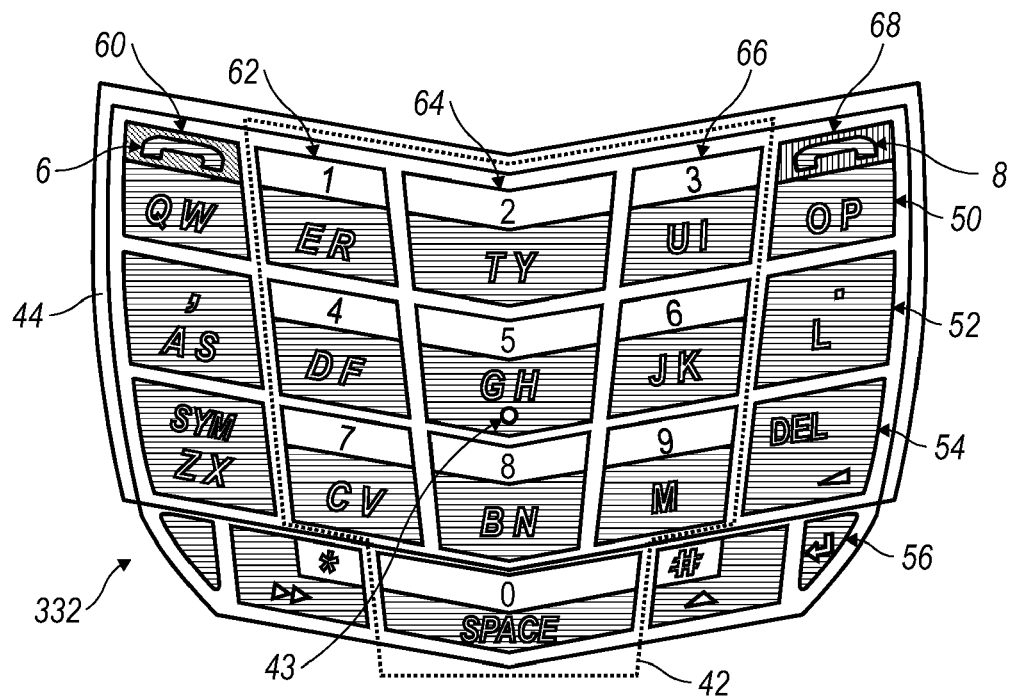
FIG. 16 is a detail view of the reduced QWERTY keyboard of device of FIG. 15.

FIG. 15 shows a handheld electronic device 300 that has an example physical keyboard array of twenty keys, with five columns and four rows. A detailed view of the keyboard 332 is presented in FIG. 16. Fourteen keys on the keyboard 332 are associated with alphabetic characters and ten keys are associated with numbers. The four rows include a first row 50, a second row 52, a third row 54, and a fourth row 56. The five columns include a first column 60, a second column 62, a third column 64, a fourth column 66, and a fifth column 68. Many of the keys have different sizes than the other keys, and the rows are non-linear. In particular, the rows are V-shaped, with the middle key in the third column 64 representing the point of the V. The columns are generally straight, but the outer two columns 60, 62, 66, 68 angle inwardly toward the middle column 64. To readily identify the phone user interface (the second user interface), the numeric phone keys 0-9 include a color scheme that is different from that of the remaining keys associated with the QWERTY key arrangement.

In this example, the color scheme of the numeric phone keys has a two tone appearance, with the upper portion of the numeric keys being a first color and the lower portion of the numeric keys being a second color. In the example, the upper portion of the keys is white with blue letters and the lower portion of the keys is blue with white letters. Most of the remaining keys associated with the QWERTY key arrangement are predominantly the second, blue color with white lettering. The first color may be lighter than the second color, or darker than the second color. In addition, the keyboard 332 includes a "send" key 6 and an "end" key 8. The "send" key 6 is positioned in the upper left corner of the keyboard 332 and the "end" key 8 is positioned in the upper right corner. The "send" key 6 and "end" key 8 may have different color schemes than the remainder of the keys in order to distinguish them from other keys. In addition, the "send" and "end" keys 6, 8 may have different colors from one another. In the example shown, the "send" key 6 is green and the "end" key 8 is red. Different colors may be utilized, if desired.

Figure 17:
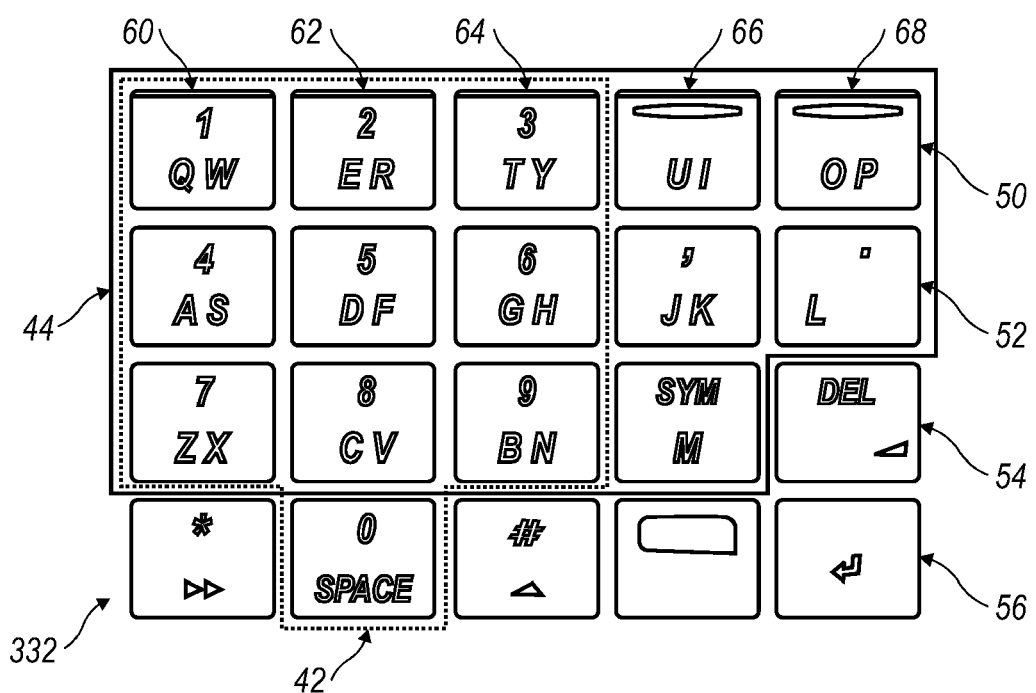
FIG. 17 is a detail view of an alternative reduced QWERTY keyboard.

FIG. 17 shows a similar format for the reduced QWERTY arrangement of alphabetic characters 44 as presented in FIG. 14, but the numeric phone key arrangement 42 is positioned in the first 60, second 62, and third 64 columns instead of being centered on the keyboard 332. The first row 50 of keys includes in order the following key combinations for the text entry and telephony mode: "QW/1", "ER/2", "TY/3", "UI/", and "OP". The second row 52 includes the following key combinations in order: "AS/4", "DF/51", "GH/6", "JK/,", and "L/.". The third row 54 includes the following key combinations in order: "ZX/7", "CV/8", "BN/9", "M/sym" and "backspace/delete". The fourth row 56 includes the following key combinations in order: "next/*", "space/0", "shift/#", "alt" and "return/enter". The keys in each of the rows are of uniform size and the rows and columns are straight.

Another embodiment of a reduced alphabetic keyboard is found on a standard phone keypad. Most handheld electronic devices 300 having a phone key pad also typically include alphabetic key arrangements overlaying or coinciding with the numeric keys as shown in FIG. 11. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 10 (no alphabetic letters) and 11 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. Regarding the numeric arrangement, it can be aptly described as a top-to-bottom ascending order three-by-three-over-zero pattern.

The table below identifies the alphabetic characters associated with each number for some other phone keypad conventions.

| Number on Key | ITU E.161 | Australia | #1 | Mobile Phone Keypad #11 (Europe) | #111 (Europe) |
|---|---|---|---|---|---|
| 1 |  | QZ |  | ABC | ABC |
| 2 | ABC | ABC | ABC | DEF | DEF |
| 3 | DEF | DEF | DEF | GHI | GHI |
| 4 | GHI | GHI | GHI | JKL | JKL |
| 5 | JKL | JKL | JKL | MNO | MNO |
| 6 | MNO | MNO | MN | PQR | PQR |
| 7 | PQRS | PRS | PRS | STU | STU |
| 8 | TUV | TUV | TUV | ÜVW | VWX |
| 9 | WXYZ | WXY | WXY | XYZ | YZ |
| 0 |  |  | OQZ |  |  |

It should also be appreciated that other alphabetic character and number combinations can be used beyond those identified above when deemed useful to a particular application.

As noted earlier, multi-tap software has been in use for a number of years permitting users to enter text using a conventional telephone key pad such as specified under ITU E 1.161 or on a touch screen display, among other devices. Multi-tap requires a user to press a key a varying number of times, generally within a limited period of time, to input a specific letter associated with the particular key, thereby spelling the desired words of the message. A related method is the long tap method, where a user depresses the key until the desired character appears on the display.

Figure 3:
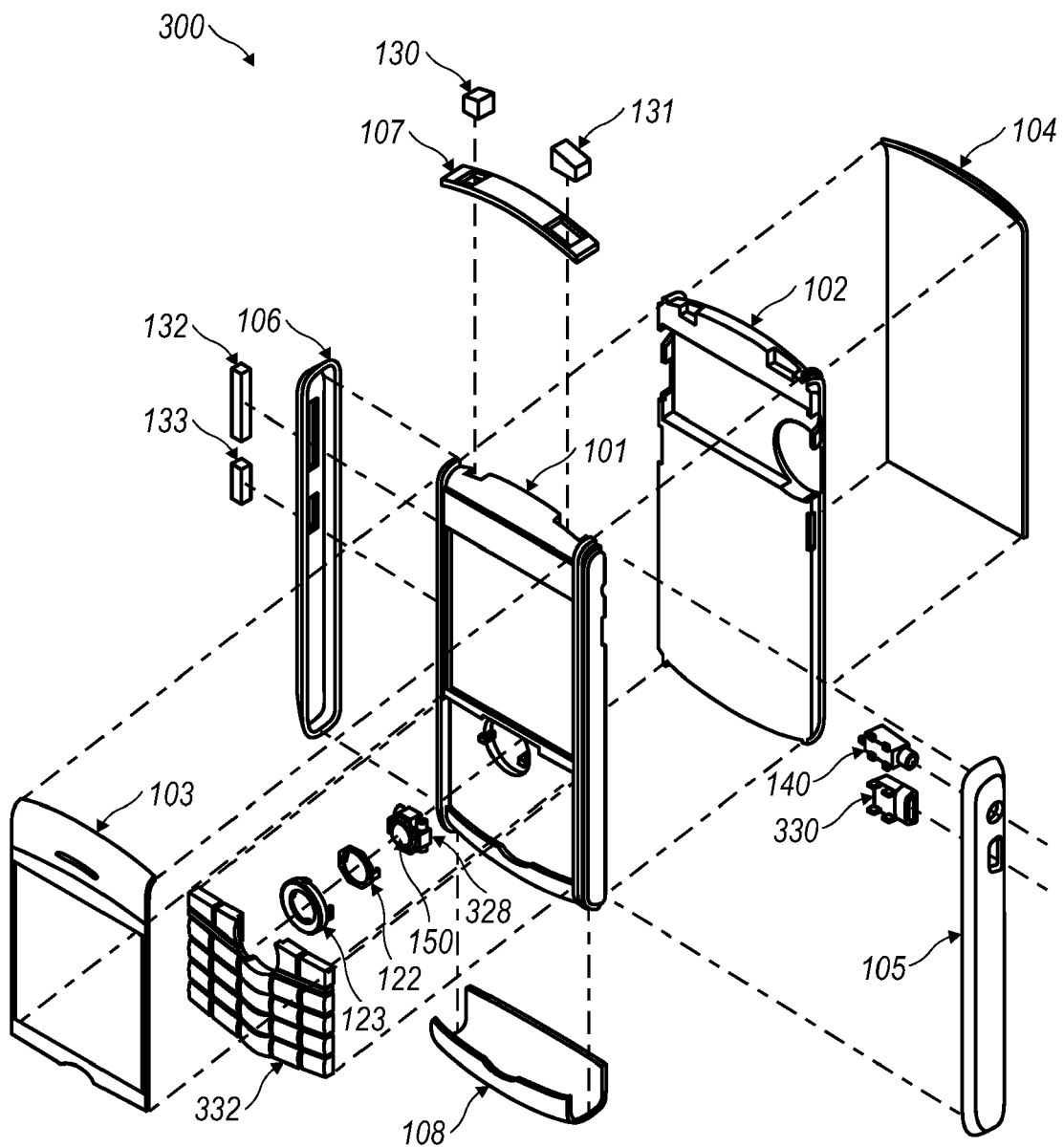
FIG. 3 is an exploded perspective view of an exemplary wireless handheld electronic device incorporating a trackball assembly as at the auxiliary input.

An exemplary handheld electronic device 300 is shown in the assembly drawing of FIG. 3 and its cooperation in a wireless network is exemplified in the block diagram of FIG. 18. These figures are exemplary only, and those persons skilled in the art will appreciate the additional elements and modifications necessary to make the device work in particular network environments.

FIG. 3 is an exploded view showing some of the typical components found in the assembly of the handheld electronic device 300. The construction of the device benefits from various manufacturing simplifications. The internal components are constructed on a single PCB (printed circuit board) 102. The keyboard 332 is constructed from a single piece of material, and in a preferred embodiment is made from plastic. The keyboard 332 sits over dome switches (not shown) located on the PCB 102 in a preferred embodiment. One switch is provided for every key on the keyboard in the preferred embodiment, but in other embodiments, more than one switch or less than one switch per key are possible configurations. The support frame 101 holds the keyboard 332 and navigation tool 328 in place above the PCB 102. The support frame 101 also provides an attachment point for the display (not shown). A lens 103 covers the display to prevent damage. When assembled, the support frame 101 and the PCB 102 are fixably attached to each other and the display is positioned between the PCB 102 and support frame 101.

The navigation tool 328 is frictionally engaged with the support frame 101, but in a preferred embodiment the navigation tool 328 is removable when the device is assembled. This allows for replacement of the navigation tool 328 if/when it becomes damaged or the user desires replacement with a different type of navigation tool 328. In the exemplary embodiment of FIG. 3, the navigation tool 328 is a trackball 150 based device. Other navigation tools 328 such as joysticks, four-way cursors, or touch pads are also considered to be within the scope of this disclosure. When the navigation tool 328 has a trackball 150, the trackball 150, itself, can be removed without removal of the navigation tool 328. The removal of the trackball 150 is enabled through the use of an outer removable ring 123 and an inner removable ring 122. These rings 122, 123 ensure that the navigation tool 328 and the trackball 150 are properly held in place against the support frame 101.

A serial port (preferably a Universal Serial Bus port) 330 and an earphone jack 140 are fixably attached to the PCB 102 and further held in place by right side element 105. Buttons 130, 131, 132, 133 are attached to switches (not shown), which are connected to the PCB 102.

Final assembly involves placing the top piece 107 and bottom piece 108 in contact with support frame 101. Furthermore, the assembly interconnects right side element 105 and left side element 106 with the support frame 101, PCB 102, and lens 103. These side elements 105, 106 provide additional protection and strength to the support structure of the device 300. In a preferred embodiment, backplate 104 is removably attached to the other elements of the device.

The block diagram of FIG. 18, representing the communication device 300 interacting in the communication network 319, shows the device's 300 inclusion of a microprocessor 338 which controls the operation of the device 300. The communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communications subsystems 340 and other device subsystems 342 are generally indicated as connected to the microprocessor 338 as well. An example of a communication subsystem 340 is that of a short range communication subsystem such as BLUETOOTH® communication module or an infrared device and associated circuits and components. Additionally, the microprocessor 338 is able to perform operating system functions and preferably enables execution of software applications on the communication device 300.

The above described auxiliary I/O subsystem 328 can take a variety of different subsystems including the above described navigation tool 328. As previously mentioned, the navigation tool 328 is preferably a trackball based device, but it can be any one of the other above described tools. Other auxiliary I/O devices can include external display devices and externally connected keyboards (not shown). While the above examples have been provided in relation to the auxiliary I/O subsystem, other subsystems capable of providing input or receiving output from the handheld electronic device 300 are considered within the scope of this disclosure.

In a preferred embodiment, the communication device 300 is designed to wirelessly connect with a communication network 319. Some communication networks that the communication device 300 may be designed to operate on require a subscriber identity module (SIM) or removable user identity module (RUIM). Thus, a device 300 intended to operate on such a system will include SIM/RUIM interface 344 into which the SIM/RUIM card (not shown) may be placed. The SIM/RUIM interface 344 can be one in which the SIM/RUIM card is inserted and ejected.

In an exemplary embodiment, the flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 can be segregated upon storage in the flash memory 324 of the device 300. However, another embodiment of the flash memory 324 utilizes a storage allocation method such that a program 358 is allocated additional space in order to store data associated with such program. Other known allocation methods exist in the art and those persons skilled in the art will appreciate additional ways to allocate the memory of the device 300.

In a preferred embodiment, the device 300 is pre-loaded with a limited set of programs that enable it to operate on the communication network 319. Another program that can be preloaded is a PIM 354 application that has the ability to organize and manage data items including but not limited to email, calendar events, voice messages, appointments and task items. In order to operate efficiently, memory 324 is allocated for use by the PIM 354 for the storage of associated data. In a preferred embodiment, the information that PIM 354 manages is seamlessly integrated, synchronized and updated through the communication network 319 with a user's corresponding information on a remote computer (not shown). The synchronization, in another embodiment, can also be performed through the serial port 330 or other short range communication subsystem 340. Other applications may be installed through connection with the wireless network 319, serial port 330 or via other short range communication subsystems 340.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks generally described as packet-switched, narrowband, data-only technologies mainly used for short burst wireless data transfer.

For the systems listed above, the communication device 300 must be properly enabled to transmit and receive signals from the communication network 319. Other systems may not require such identifying information. A GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. In some locations, the communication device 300 will be enabled to work with special services, such as "911" emergency, without a SIM/RUIM or with a non-functioning SIM/RUIM card. A SIM/RUIM interface 344 located within the device allows for removal or insertion of a SIM/RUIM card (not shown). This interface 344 can be configured like that of a disk drive or a PCMCIA slot or other known attachment mechanism in the art. The SIM/RUIM card features memory and holds key configurations 351, and other information 353 such as identification and subscriber related information. Furthermore, a SIM/RUIM card can be enabled to store information about the user including identification, carrier and address book information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae 316, 318 in another preferred embodiment are combined into a single antenna (not shown). As one skilled in the art would appreciate, the antenna or antennae 316, 318 in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae 316, 318 as described above, local oscillators (LOs) 313, and a processing module 320 which in a preferred embodiment is a digital signal processor (DSP) 320.

A signal received by the communication device 300 is first received by the antenna 316 and then input into a receiver 312, which in a preferred embodiment is capable of performing common receiver functions including signal amplification, frequency down conversion, filtering, channel selection and the like, and analog to digital (A/D) conversion. The A/D conversion allows the DSP 320 to perform more complex communication functions such as demodulation and decoding on the signals that are received by DSP 320 from the receiver 312. The DSP 320 is also capable of issuing control commands to the receiver 312. An example of a control command that the DSP 320 is capable of sending to the receiver 312 is gain control, which is implemented in automatic gain control algorithms implemented in the DSP 320. Likewise, the communication device 300 is capable of transmitting signals to the communication network 319. The DSP 320 communicates the signals to be sent to the transmitter 314 and further communicates control functions, such as the above described gain control. The signal is emitted by the device 300 through an antenna 318 connected to the transmitter 314.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

In the instance of voice communications, voice transmissions that originate from the communication device 300 enter the device 300 though a microphone 336. The microphone 336 communicates the signals to the microprocessor 338 for further conditioning and processing. The microprocessor 338 sends the signals to the DSP 320 which controls the transmitter 314 and provides the correct signals to the transmitter 314. Then, the transmitter 314 sends the signals to the antenna 318, which emits the signals to be detected by a communication network 319. Likewise, when the receiver 312 obtains a signal from the receiving antenna 316 that is a voice signal, it is transmitted to the DSP 320 which further sends the signal to the microprocessor 338. Then, the microprocessor 338 provides a signal to the speaker 334 of the device 300 and the user can hear the voice communication that has been received. The device 300 in a preferred embodiment is enabled to allow for full duplex voice transmission.

In another embodiment, the voice transmission may be received by the communication device 300 and translated as text to be shown on the display screen 322 of the communication device 300. The communication device 300 is also capable of retrieving messages from a voice messaging service operated by the communication network operator. In a preferred embodiment, the device 300 displays information in relation to the voice message, such as the number of voice messages or an indication that a new voice message is present on the operating system.

In a preferred embodiment, the display 322 of the communication device 300 provides an indication about the identity of an incoming call, duration of the voice communication, telephone number of the communication device, call history, and other related information. It should be appreciated that the above described embodiments are given as examples only and one skilled in the art may effect alterations, modifications and variations to the particular embodiments without departing from the scope of the application.

As stated above, the communication device 300 and communication network 319 can be enabled to transmit, receive and process data. Several different types of data exist and some of these types of data will be described in further detail. One type of data communication that occurs over the communication network 319 includes electronic mail (email) messages. Typically an email is text based, but can also include other types of data such as picture files, attachments and html. While these are given as examples, other types of messages are considered within the scope of this disclosure as well.

When the email originates from a source outside of the device and is communicated to the device 300, it is first received by the receiving antenna 316 and then transmitted to the receiver 312. From the receiver 312, the email message is further processed by the DSP 320, and it then reaches the microprocessor 338. The microprocessor 338 executes instructions as indicated from the relevant programming instructions to display, store or process the email message as directed by the program. In a similar manner, once an email message has been properly processed by the microprocessor 338 for transmission to the communication network 319, it is first sent to the DSP 320, which further transmits the email message to the transmitter 314. The transmitter 314 processes the email message and transmits it to the transmission antenna 318, which broadcasts a signal to be received by a communication network 319. While the above has been described generally, those skilled in this art will appreciate those modifications which are necessary to enable the communication device 300 to properly transmit the email message over a given communication network 319.

Furthermore, the email message may instead be transmitted from the device 300 via a serial port 330, another communication port 340, or other wireless communication ports 340. The user of the device 300 can generate a message to be sent using the keyboard 332 and/or auxiliary I/O 328, and the associated application to generate the email message. Once the email message is generated, the user may execute a send command which directs the email message from the communication device 300 to the communication network 319. In an exemplary embodiment, a keyboard 332, preferably an alphanumeric keyboard, is used to compose the email message. In a preferred embodiment, an auxiliary I/O device 328 is used in addition to the keyboard 332.

While the above has been described in relation to email messages, one skilled in the art could easily modify the procedure to function with other types of data such as SMS text messages, internet websites, videos, instant messages, programs and ringtones. Once the data is received by the microprocessor 338, the data is placed appropriately within the operating system of the device 300. This might involve presenting a message on the display 322 which indicates the data has been received or storing it in the appropriate memory 324 on the device 300. For example, a downloaded application such as a game will be placed into a suitable place in the flash memory 324 of the device 300. The operating system of the device 300 will also allow for appropriate access to the new application as downloaded.

Exemplary embodiments have been described hereinabove regarding handheld electronic devices 300 and wireless handheld communication devices 300 as well as the communication networks within which they cooperate. It should be appreciated, however, that a focus of the present disclosure is the enablement of a lockable keyboard for a handheld electronic device 300.

What is claimed is:

1. A handheld communication device, comprising:
   a keyboard having a plurality of buttons for inputting information into the device;
   a graphical display;
   a navigation tool by means of which a user interacts with the device, said navigation tool including a rolling element; and
   a processor which controls operation of the device, said processor running a program which suspends operability of a subset of said buttons and which suspends operability of said navigation tool when a pre-selected action is taken by the user and which restores operability of said buttons and said navigation tool when a subsequent pre-selected action is taken by the user that includes actuations of said navigation tool and at least one of said buttons in a predetermined order, said keyboard has buttons corresponding to the letters A-Z of the English alphabet and said letters of the English alphabet correspond to buttons on said keyboard on a multiple-letter-per-button basis.

2. The device of claim 1, wherein said navigation tool is a press-click trackball device and wherein said pre-selected action comprises press-clicking and holding said trackball device for a pre-determined period of time.

3. The device of claim 1, wherein said pre-selected action is user-definable.

4. The device of claim 1, wherein said pre-selected action is pre-programmed.

5. The device of claim 1, wherein said letters of the English alphabet are arranged in one of a QWERTY or QWERTZ or AZERTY or Dvorak arrangement.

6. A method for protecting a handheld electronic device provided with a keyboard having a multiplicity of depressible keys from inadvertent depressions of said keys, wherein the device is useful for wireless communication, said method comprising the steps of:
   providing a navigation tool having a rolling member that rolls about at least one axis, wherein the navigation tool is actuable by rolling and by depressing the rolling member;
   setting the handheld electronic device in a mode where the functioning of the navigation tool and of the keys in at least part of the keyboard are prevented so that a keyboard lock mode is established; and
   activating the setting of the keyboard lock mode as a response to a given first keyboard command issued by said navigation tool, and wherein said keyboard lock mode is removed as a response to a second given keyboard command that includes actuations of said navigation tool and at least one of said keys in a predetermined order, said handheld electronic device comprises a lighted display located above the keyboard suitable for accommodating textual input to the handheld electronic device when said handheld electronic device is in an operable configuration, said navigation tool being located essentially between the display and keyboard in the operable configuration and said multiplicity of keys comprising a portion of keys having alphabetic letters associated therewith, and wherein at least one key of the portion of keys having alphabetic letters has multiple letters associated therewith.

7. The method according to claim 6, wherein the keyboard lock mode is activated as a response to depressing and holding the rolling member down for a predetermined time, so that the depressing and holding constitutes said given first keyboard command.

8. The method according to claim 6, wherein said second given keyboard command is different from said given first keyboard command.

9. The method according to claim 6, wherein in the keyboard lock mode, the functions caused by all other keys are prevented, except for those keys that are needed for giving said second given keyboard command.

10. The method according to claim 6, wherein said handheld electronic device transmits data to, and receives data from a communication network utilizing radio frequency signals.

11. The method according to claim 10, wherein the data transmitted between said handheld electronic device and the communication network supports voice and textual messaging.

12. The method according to claim 6, wherein said alphabetic letters are configured in one of a QWERTY or QWERTZ or AZERTY or Dvorak layout.

13. The method according to claim 6, wherein said navigation tool is a trackball.

14. A handheld electronic device useful for wireless communication, comprising:
   a lighted display;
   a keyboard for producing keyboard commands indicative of functions to be performed;
   a navigation tool for producing navigation tool commands indicative of functions to be performed, said navigation tool having a rolling member that rolls about at least one axis, wherein the navigation tool is actuable by rolling and by depressing the rolling member and wherein the navigation tool is located below the lighted display and above the keyboard;
   means for interpreting the navigation tool and keyboard commands given by the navigation tool and keyboard and producing functions indicated thereby;
   control means for producing a temporary prevention of the producing of the functions caused by the navigation tool and at least part of the keys in the keyboard, so that there is formed a keyboard lock mode;

means for detecting when said navigation tool gives a keyboard lock command;

means for transmitting the indicative signal as to the navigation tool giving said keyboard lock command to the control means in order to form a keyboard lock mode when so indicated; and means for re-enabling said functions caused by the navigation tool and at least part of the keys in the keyboard in response to a keyboard unlock command that includes actuations of said navigation tool and at least one of said keys in a predetermined order, wherein said lighted display being located above the keyboard suitable for accommodating textual input to the handheld electronic device when said handheld electronic device is in an operable configuration, said navigation tool being located essentially between the lighted display and keyboard in the operable configuration and said keyboard comprising a portion of keys having alphabetic letters associated therewith, and wherein at least one key of the portion of keys having alphabetic letters has multiple letters associated therewith.

15. The device according to claim 14, wherein said detecting means comprises means, responsive to the depressing and holding of the rolling member down for a predetermined time, for producing said indicative signal activating the keyboard lock mode.

16. The device according to claim 14, wherein said keyboard unlock command is different from said keyboard lock command of said rolling member, for removing said keyboard lock mode.

17. The device according to claim 14, wherein said control means comprises means, responsive to said indicative signal, for forming said keyboard lock mode, such that the functions caused by all of the keys in the keyboard are prevented, except for those keys that are needed for giving said keyboard unlock command.

18. The device according to claim 14, wherein said handheld electronic device transmits data to, and receives data from a communication network utilizing radio frequency signals.

19. The device according to claim 18, wherein the data transmitted between said handheld electronic device and the communication network supports voice and textual messaging.

20. The device according to claim 14, wherein said alphabetic letters are configured in one of a QWERTY or QWERTZ or AZERTY or Dvorak layout.

21. The device according to claim 14, wherein said navigation tool is a trackball.

22. A handheld electronic device useful for wireless communication, comprising:

a navigation tool for producing navigation tool commands indicative of functions to be performed, said navigation tool having a rolling member that rolls about at least one axis, wherein the navigation tool is actuable by rolling and by depressing the rolling member;

a keyboard having a multiplicity of depressible keys for producing keyboard commands indicative of functions to be performed;

means for interpreting the navigation tool and keyboard commands given by said depressible keys of the keyboard and producing functions indicated thereby;

control means for producing a temporary prevention of the producing of the functions caused by the navigation tool and at least part of the keys of the keyboard, so that there is formed a keyboard lock mode, means for detecting the manner in which the rolling member is depressed and producing a signal representing a keyboard lock command and indicative the keyboard lock mode;

means for transmitting said indicative signal to the control means in order to form the keyboard lock;

means for re-enabling said functions caused by the navigation tool and at least part of the keys of the keyboard in response to a keyboard unlock command that includes actuations of said navigation tool and at least one of said keys in a predetermined order, said handheld electronic device comprises a lighted display located above the keyboard suitable for accommodating textual input to the handheld electronic device when said handheld electronic device is in an operable configuration, said navigation tool being located essentially between the display and keyboard in the operable configuration and said multiplicity of keys comprising a portion of keys having alphabetic letters associated therewith, and wherein at least one key of the portion of keys having alphabetic letters has multiple letters associated therewith.

23. The device according to claim 22, wherein said detecting means comprises means, responsive to the depressing and holding of the rolling member down for a predetermined time, for producing said indicative signal activating the keyboard lock mode.

24. The device according to claim 22, wherein said keyboard unlock command is different from said keyboard lock command of said rolling member, for removing said keyboard lock mode.

25. The device according to claim 22, wherein said control means comprises means, responsive to said indicative signal, for forming said keyboard lock mode, such that the functions caused by all of the keys in the keyboard are prevented, except for those keys that are needed for giving said keyboard unlock command.

26. The device according to claim 22, wherein said handheld electronic device transmits data to, and receives data from a communication network utilizing radio frequency signals.

27. The device according to claim 26, wherein the data transmitted between said handheld electronic device and the communication network supports voice and textual messaging.

28. The device according to claim 22, wherein said alphabetic letters are configured in one of a QWERTY or QWERTZ or AZERTY or Dvorak layout.

29. The device according to claim 22, wherein said navigation tool is a trackball.

30. A handheld communication device useful for wireless communication, comprising:

a navigation tool having a rolling member that rolls about at least one axis, wherein the navigation tool is actuable by rolling and by depressing the rolling member;

a keyboard having a plurality of externally accessible and individually actuable keys;

means for sensing the actuation of the navigation tool when depressed in a unique predetermined number of times; and means responsive to said sensing means for disabling the navigation tool and at least some of the externally accessible and individually actuable keys of said keyboard, and wherein said responsive means re-enables said navigation tool and said actuable keys in response to actuations of said navigation tool and at least one of said plurality of keys in a predetermined order, said handheld electronic device comprises a lighted display located above the keyboard suitable for accommodating textual input to the handheld electronic device when said handheld electronic device is in an operable configuration, said navigation tool being located essentially between the display and keyboard in the operable configuration and said plurality of keys comprising a portion of keys having alphabetic letters associated therewith, and wherein at least one key of the portion of keys having alphabetic letters has multiple letters associated therewith.

31. The device as claimed in claim 30, wherein the navigation tool is selected from the group consisting of a trackball, a wheel, and a roller barrel.

32. The device as claimed in claim 30, wherein the navigation tool is a trackball, wherein the trackball has a ball in a housing that rolls about a plurality of axes, wherein the trackball is actuable by rolling and by depressing the ball.

33. The device as claimed in claim 30, wherein the sensing means disables a portion of said plurality of keys.

34. The device as claimed in claim 30, wherein said portion of keys having alphabetic letters is all the keys other than a first key, which is one of said plurality of keys.

35. The device as claimed in claim 30, wherein at least one of said plurality of keys is a first key.

36. The device as claimed in claim 35, wherein said first key is associated with at least one alternative function.

37. The device as claimed in claim 36, wherein the sensing means disables said first key in relation to said at least one alternative function.

38. The device as claimed in claim 30, wherein said predetermined order of navigation tool and key actuation involves depressing said navigation tool and a first key simultaneously.

39. The device as claimed in claim 30, wherein said predetermined order of key actuation involves depressing said navigation tool and a first key successively.

40. The device as claimed in claim 30, further comprising:
means for automatically interrupting key disablement responsive to sensing an incoming call.

41. The device as claimed in claim 30, further comprising:
means for automatically terminating key disablement when circuitry in the apparatus senses an incoming call.

42. The device as claimed in claim 30, wherein said handheld electronic device transmits data to, and receives data from a communication network utilizing radio frequency signals.

43. The device as claimed in claim 42, wherein the data transmitted between said handheld electronic device and the communication network supports voice and textual messaging.

44. The device as claimed in claim 30, wherein said alphabetic letters are configured in one of a QWERTY or QWERTZ or AZERTY or Dvorak layout.

45. The device as claimed in claim 30, wherein said navigation tool is a trackball.

* * * * *

UNITED STATES PATENT AND TRADEMARK OFFICE
CERTIFICATE OF CORRECTION

PATENT NO. : 7,649,477 B2 Page 1 of 1
APPLICATION NO. : 11/423774
DATED : January 19, 2010
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this

Twenty-eighth Day of December, 2010

David J. Kappos
*Director of the United States Patent and Trademark Office*